C. H. CAMPBELL.
DRIED MILK AND METHOD FOR PRODUCING THE SAME.
APPLICATION FILED DEC. 21, 1915.
1,233,446.
Patented July 17, 1917.
5 SHEETS—SHEET 1.
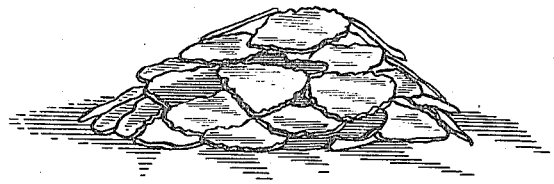
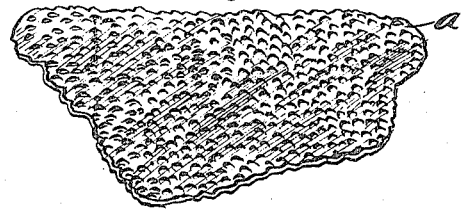
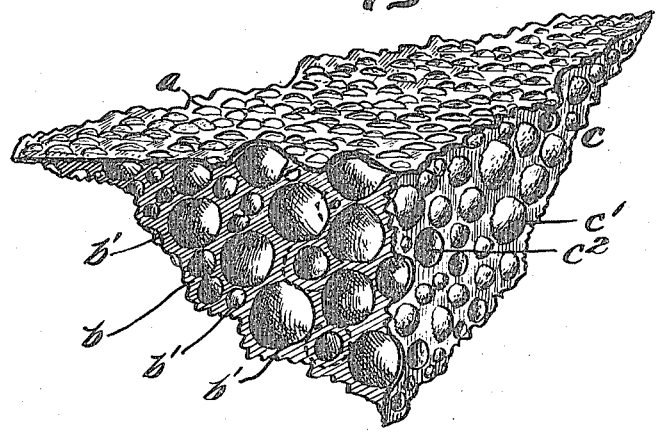

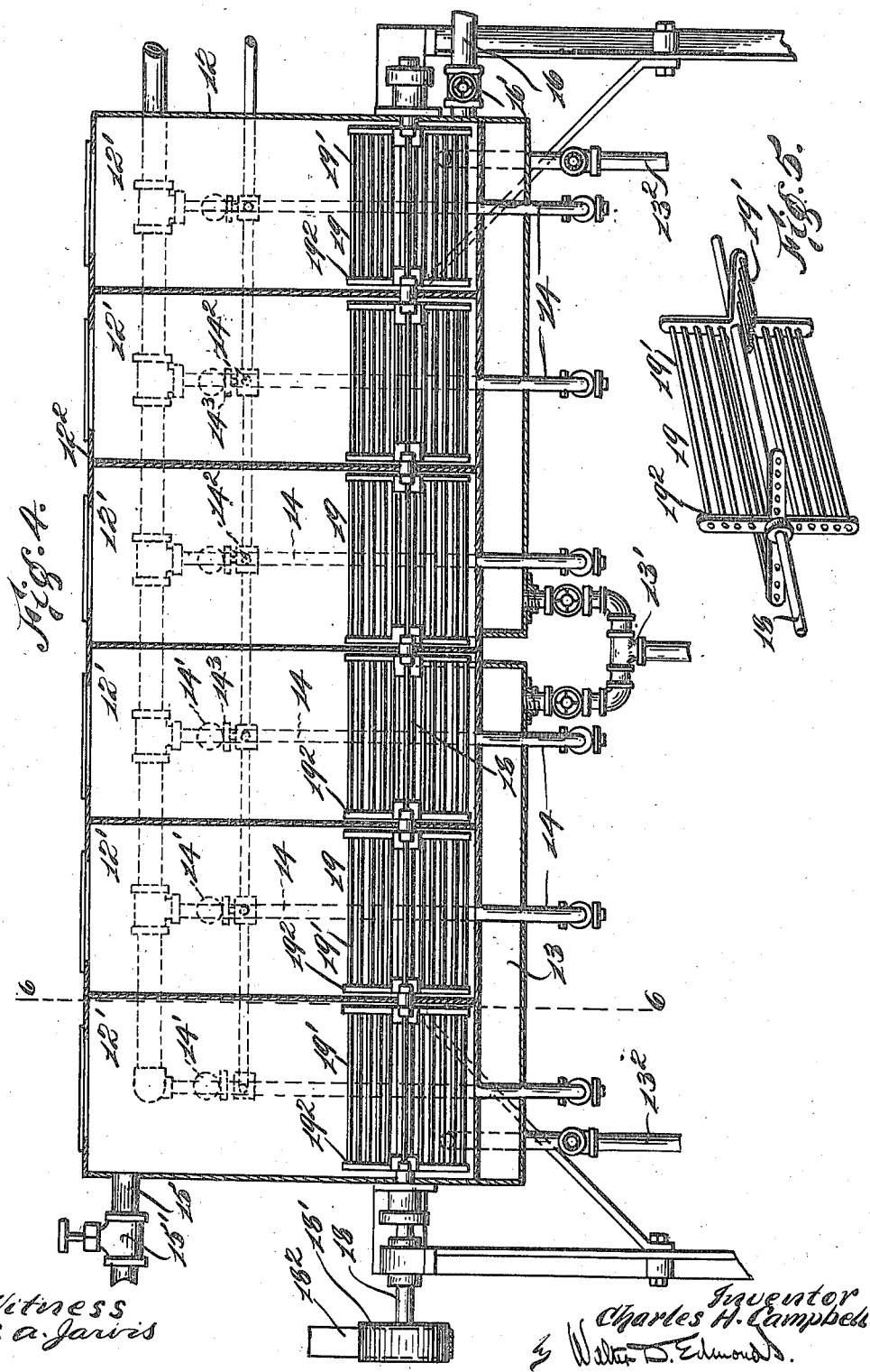

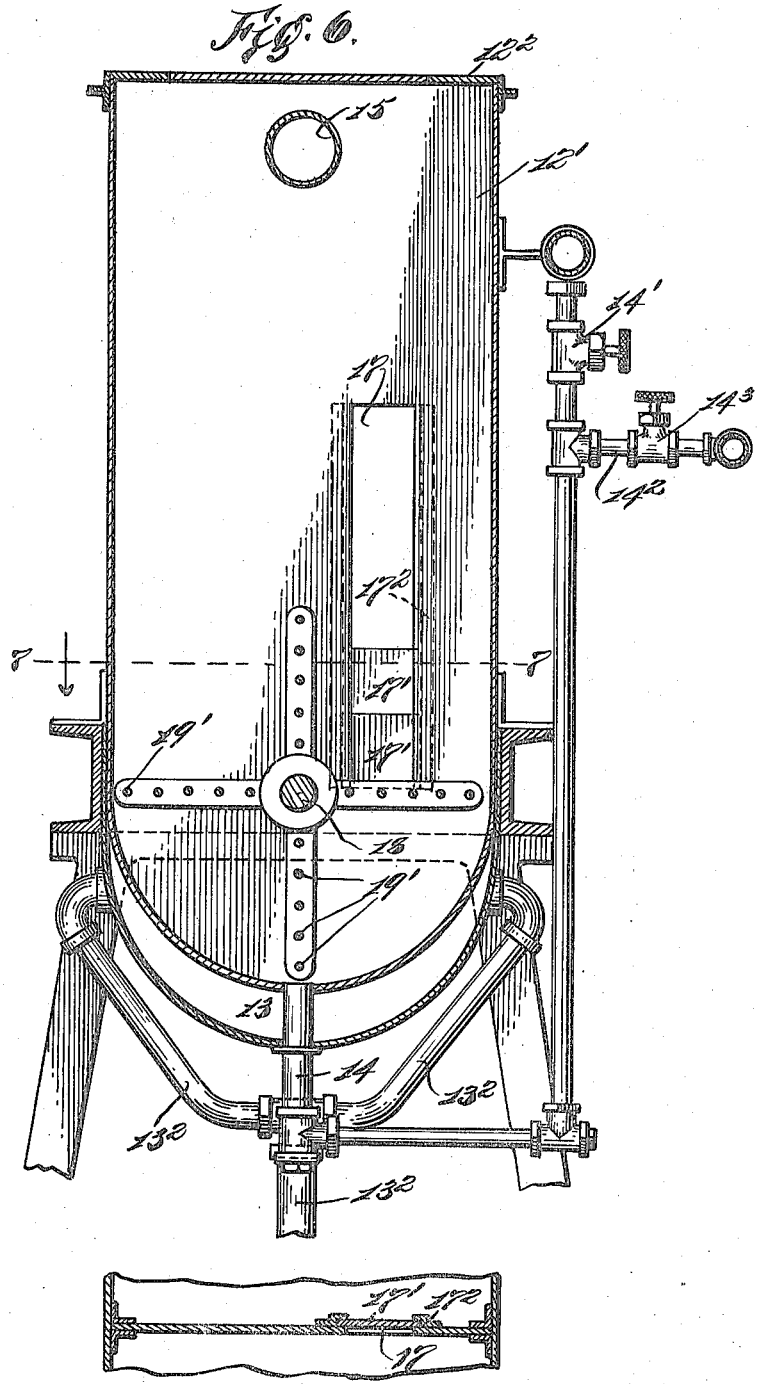

C. H. CAMPBELL.
DRIED MILK AND METHOD FOR PRODUCING THE SAME.
APPLICATION FILED DEC. 21, 1915.
1,233,446.
Patented July 17, 1917.
5 SHEETS—SHEET 4.
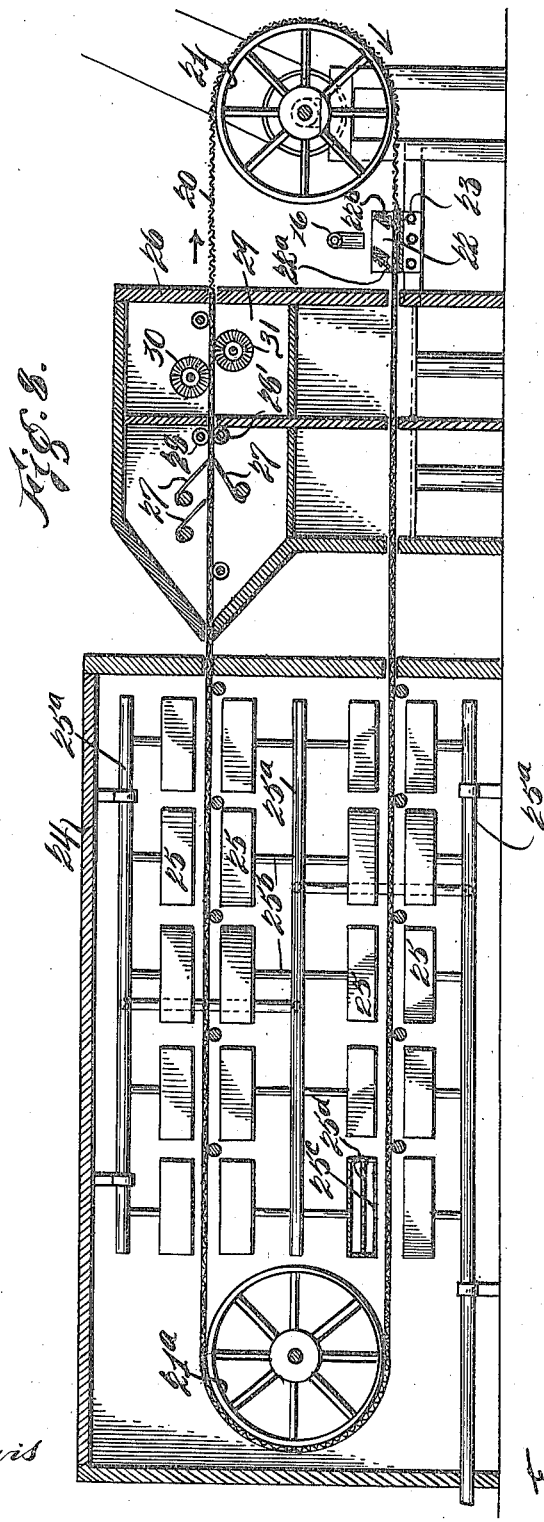

C. H. CAMPBELL.
DRIED MILK AND METHOD FOR PRODUCING THE SAME.
APPLICATION FILED DEC. 21, 1915.

1,233,446.

Patented July 17, 1917.
5 SHEETS—SHEET 5.

Witness
C. A. Jarvis

Inventor
Charles H. Campbell

UNITED STATES PATENT OFFICE.

CHARLES H. CAMPBELL, OF NEW YORK, N. Y., ASSIGNOR TO BORDEN'S CONDENSED MILK COMPANY, OF NEW YORK, N. Y., A CORPORATION OF NEW JERSEY.

DRIED MILK AND METHOD FOR PRODUCING THE SAME.

1,233,446.     Specification of Letters Patent.     Patented July 17, 1917.

Application filed December 21, 1915. Serial No. 67,996.

*To all whom it may concern:*

Be it known that I, CHARLES H. CAMPBELL, a citizen of the United States, residing in the borough of Manhattan, city, county, and State of New York, have invented new and useful Improvements in Dried Milk and Methods for Producing the Same, of which the following is a specification.

My invention relates to dried or desiccated milks and methods of producing them, and its objects comprise provision of an industrially practicable procedure, the final product of which is composed solely of constituents of the natural milk, whence it is derived, and which, as compared with any other dried milks known to me, is more rapidly and perfectly soluble in water, which, as thus "reconstituted", possesses more nearly and perfectly all the desirable characteristics and behaviors of natural milk, and the peptogenic properties of which are even more effective than those of the natural milk.

The accompanying drawings illustrate some of the distinguishing physical characteristics of my novel dried milk product, and one form of apparatus adapted to aid in the production thereof by my novel method.

Figure 1 is a perspective view of some of my dried milk in mass, showing the preferred, original, flake-like form or groupings of its constituent solids.

Fig. 2 is a perspective view, on an enlarged scale, of one of the flakes.

Fig. 3 is a perspective view, on greatly enlarged scale, of a fragment of one of the flakes showing one surface, $b$, cut in section to show the interior of the cells and another surface, $a$, in its normal plane state, the remaining surfaces, or edges, being shown as fractured.

Fig. 4 is a side view, largely in section, of my aerating and stirring devices.

Fig. 5 is a detail perspective view of one of the stirrers isolated.

Fig. 6 is, on enlarged scale, a cross sectional view on line 5—5 of Fig. 4 viewed in the direction of the arrow.

Fig. 7 is a sectional view on line 7—7 of Fig. 6 viewed in the direction of the arrow, and showing the means for holding the removable bars.

Fig. 8 is a side view largely in section of my drying apparatus.

Like reference numerals and letters refer to like parts in the respective figures.

Figure 9:
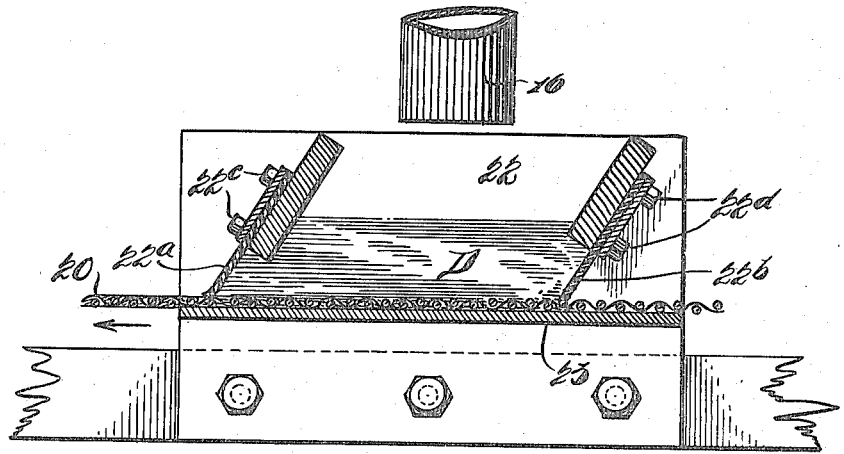
Fig. 9 is, on enlarged scale, a detail view partly in section of my appliances for feeding the aerated batter onto the conveyer, and regulating its thickness thereon.
Figure 10:
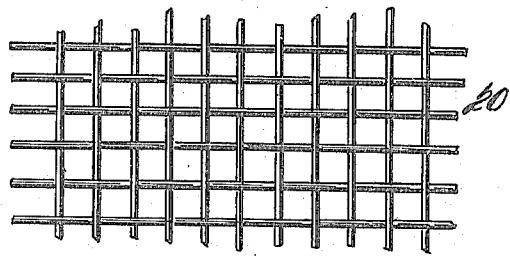
Fig. 10 is a fragmentary plan, on enlarged scale, of part of my air-permeable conveyer belt.

My method of producing my dried milk product is as follows: I first procure, or produce, in any convenient way, a concentrate of normal, fluid, skimmed, milk. I have discovered that it is essential for requisite viscosity that the albumin of such concentrate be uncoagulated, and it is preferable that all of its other constituents retain likewise their normal characteristics and qualities as in the natural milk.

Such concentrate is producible by such method and means as are disclosed in Letters Patent No. 668,161, dated February 19, 1901, to Joseph H. Campbell, or in my pending applications for Letters Patent Serial Nos. 781,081, filed July 25th, 1913, and 865,647, filed October 8th, 1914, in which, by aid of blowing air into the milk, it is concentrated so rapidly as to avoid undesired changes of its constituents.

I have also discovered that in order to produce the most desirable form of my dried product, it is preferable that the milk be thus concentrated down to not less than one-third, and preferably down to about one-sixth, of its original volume.

This concentrated milk thus obtained, I next aerate, in such manner as to pervasively and homogeneously occlude, throughout the mass, the greatest possible number of separated, relatively minute, bodies of air, thereby pervading the semi-liquid viscous concentrate of milk solids by a great number of mutually, closely approximated, relatively minute and persistent spherical cells, whereby a substantially infinite number of curved interior surfaces are imparted to the mass.

Such aeration I accomplish by injecting into the concentrate, air, or other suitable gas, under pressure, and meanwhile stirring the commingled air and concentrate, the pressure, volume, and direction of the gas, and the rapidity and extent of the stirring, being so regulated, as is readily ascertained in each particular case, to insure presence of the greatest possible number of the said cells in the concentrate.

It will be understood that the object and result of such cotemporaneous aeration and stirring is not to expand and lift portions of the concentrate in the form of bubbles or foam, but to uniformly expand all parts of the mass simultaneously and evenly by the multitude of small gas-containing cells thus created therein.

The instrumentalities employed to thus stir, should be of such form and operation as to continuously displace, distort, and break up therewith contacting portions of the viscid concentrate, and of thereagainst bearing bodies of compressed gas, whereby is secured the desired multiplication and minuteness of the subdivisions of the latter in the concentrate.

I have invented in aid of thus aerating the thus concentrated milk, the combination of devices shown in Figs. 4, 5 and 6 of the drawings, in which 12 represents a suitably stationarily supported, longitudinally extended, tank or container, for the concentrated milk, divided by partitions 12' into a series of alike intercommunicating chambers, and preferably provided with any suitable cover 12², and with an ordinary jacket, or jackets, 13, connected in the usual manner, or by suitably valved conduits 13' with the usual sources (not shown) of temperature-influencing mediums, and provided as of course with the usual outlets 13².

Into each compartment, adjacent the bottom thereof, means are provided for injecting thereinto compressed air, or other suitable gas, these being, in this instance, the conduit pipes 14 leading to a suitable source of supply (not shown), and each provided with a valve 14' whereby the volume admitted may be regulated as required.

Incidentally, I prefer to also connect the said pipes with a steam supply, as per the branch pipe 14² (Fig. 6), provided with a valve 14³, whereby the temperature of the compressed air may be raised if desired.

A pipe 15 (Fig. 4) connecting the interior of one end of the tank with any suitable source of supply of the concentrated milk, and provided with a valve 15', affords means for charging the tank as and when required.

Another pipe 16 provided with a valve 16' affords an outlet for the concentrate after its treatment in the tank.

Intercommunication between the chambers, such as to enable the milk to flow sequentially through the series, is provided, in this instance, by means of openings 17 (Fig. 6), in each of the partitions, the aperture of which is variable as required, by means of removable bars 17' slidably held by aid of guide flanges 17² (Fig. 7), carried by the partition adjacent the vertical sides of the opening, the height of the opening being proportional to the number of said bars at any time so held across it.

A rotatory shaft 18 is mounted in the sides of the tank and its partitions, and provided with the usual pulley 18', belt 18², and other connections with a source of power (not shown).

The shaft 18 carries within each of the chambers a stirring or mixing device 19 (Fig. 5), in this instance, composed of a plurality of mutually-parallel attenuated rods 19', preferably about one-quarter inch diameter, carried by frames 19² secured to the shaft.

The operation is as follows: The aforesaid concentrated milk is admitted through pipe 15 in quantity sufficient to fill the first compartment. The valve 14' being now opened, compressed air is then injected thereinto and the shaft 18 simultaneously rotated. The rods are thus caused to constantly, momentarily, divide therewith contacting portions of the viscous concentrate, and of the air bodies therein in motion. This results in an intimacy and completeness of mixture of the air and concentrate otherwise unattainable, and the concentrate being sufficiently viscous, the very minute subdivisions of air, or bubbles, are thereby persistently retained, as compared with otherwise larger occlusions of air. As the operation proceeds the feed of concentrate is continued, and the overflow passes through the openings in the partitions sequentially through each of the chambers, and during its transit is progressively more and more completely and homogeneously aerated, the product as it emerges through the outlet 16 being filled as full as it can hold of the minutest possible air bodies, or bubbles, which are so crowded in the concentrate matrix, and so minute, and many, as to remain substantially stationary and inertly imprisoned and intact, notwithstanding gravity, atmospheric pressures, or the moderate disturbing influences to which exposed by the next step of my method. During the operation there is circulated through the jacket 13 and its connections, the usual flow of a temperature-influencing medium, such as heated water, but in order to preserve the milk constituents unchanged, and particularly at this stage, the viscosity of the concentrate, the temperature should not be raised above that of the coagulating point of albumin. My next step consists in dehydrating, or extracting from my, at this stage, aerated batter substantially all of its remaining moisture, or sufficiently to produce my final dried product.

From the outlet pipe 16 the batter is conveyed in any convenient manner and spread in a layer of uniform thickness upon a forwarding instrumentality, adapted to expose the greatest surface thereof with least disturbance to the therein occluded bubbles.

I have discovered that these requirements are best subserved by using as such instrumentality, an endless carrier in the form of an air-permeable yielding belt 20 (Figs. 8–11), composed, in this instance, of nineteen gage wire two and one half mesh.

This belt is carried and endlessly forwarded in the direction of the arrow, in the usual manner, as by aid of pulleys 21, 21$^a$, (Fig. 8) and other instrumentalities not shown. Adjacent one of these pulleys, I support, stationarily, over the belt, a rectangular, storage hopper 22 (Figs. 8 and 9) beneath the open bottom of which I stationarily support a floor or bottom 23 with which the lateral sides of the hopper contact. The sides of the hopper, transverse the belt, are preferably inclosed, as shown in Fig. 9, and provided with inclined plates 22$^a$ and 22$^b$ adjustable in any convenient manner, as by set-screws 22$^c$ and 22$^d$, so that their edges may be approximated and held, in required relation to the top of the belt, which passes between them and said floor as shown. These plates, or at least their belt-approximating edges, should be composed of flexible or, to an extent, yielding material. The outlet pipe 16 vents into the hopper, as shown in Fig. 9. The construction is such that some of the aerated batter concentrate, D, is constantly accumulated upon the belt within the confines of the hopper. By adjusting the proximity of the lower edge of the plate 22$^a$ to the top of the belt, a uniform desired thickness is imparted to the layer of batter which is being entrained and carried forward by its entanglement with the belt. This substantial uniformity of thickness in the layer is of essential importance, inasmuch as without it, it is impossible to uniformly dry with desired rapidity all portions of the belt-carried batter. The plate 22$^b$ should be adjusted to as close contact with the belt and floor as is permissible without undue frictional retardation of movement. The function of this plate is not only to close that side of the hopper against undue leakage of the batter, but also to wipe off of the thereunder-advancing belt any particles of thereto still adherent dried milk.

Figure 11:
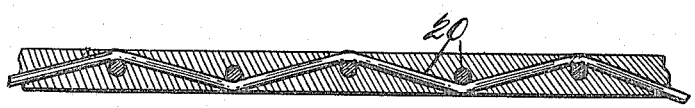
Fig. 11 is a detail side view of the belt showing the disposition thereon of the aerated batter.

The relative dispositions of the belt and its thereto adherent layer of aerated batter, are indicated in Fig. 11, in which the layer and the warp wires are shown in section, and the woof wires in perspective.

The belt, as it advances, carries the layer into a drying chamber 24, where it passes, as shown, between an extended series of oppositely-disposed, stationarily supported, alike, driers 25, consisting of a reservoir connected by pipes 25$^a$, and 25$^b$, with a source of heated, or dried and heated, air, (not shown) under pressure sufficient to propel the air. Each reservoir is open toward the belt, but in order to insure uniformity of distribution and to avoid any disturbing air pressures against the batter, I prefer to interpose over the opening a screen 25$^c$ of moderately open mesh, and, to the same end, to interpose medially in the reservoir another like screen 25$^d$ of somewhat larger mesh. By these means a constant outbreath of heated air is simultaneously applied to both sides of the layer of batter, but so diffusedly and gently that the integrity of the air bubbles in the batter is not destroyed, or jeopardized, as might be if the ordinary hot air blasts of the art were employed.

I prefer that the drying should be accomplished without raising the temperature so high as to coagulate the albumin, nor so high as to change the natural physical and chemical characteristics of the other milk solids and constituents other than water.

The thus rapidly and uniformly drying batter is, by the belt, conveyed, within the drying chamber, around the pulley 21$^a$ and thus out of the chamber. Thence it passes into a removal chamber 26 (Fig. 8), wherein any convenient instrumentalities can be operated to remove the now dried product from the belt. I have in the present instance diagrammatically indicated such instrumentalities as scrapers 27, supported and disposed to yieldingly scrape the product off the belt, also as coacting rolls 28, 28'. These instrumentalities break off of the belt in flake-like forms, or groups, most of the thereto adherent, now dried, milk solids. These fall by gravity to the bottom of the chamber, whence they may be removed, for use, by any well known means. I provide adjacent the main removal chamber, an auxiliary chamber 29 for collection, therein, of minute particles of the dried solids which may still adhere to the belt, and which are of value as a secondary, though less desirable commercial product, these minute particles, though more rapidly and perfectly soluble than any dried milk known to me, being in mass not quite so rapidly soluble as the larger flakes. In this chamber 29 I brush the belt thoroughly, using, in this instance, cylindrical revolving brushes 30, 30', of type too familiar to require further description here. The belt emerges from the chamber 29 substantially cleansed of all thereto-adhering particles, passes over the pulley 21 and returns to its original position beneath the hopper 22, and the cycle is indefinitely repeated.

It will be noted that throughout the operations described, care is taken to exempt the aerated batter, until dried, from any shocks or pressures capable of seriously disrupting its integrity and continuity, or of causing the therein occluded air globules to disrupt or escape from the still plastic magma constituting their matrix. But the constitution imparted to that magma by the preceding procedures and treatment is such that it is sufficiently viscous and tenacious to endure all the ordinary strains incident to the operation, without releasing its occluded air. In this, it differs notably from anything producible by merely beating or otherwise converting raw milk, or even concentrated milk, into mere froth or foam. I am aware that it has been suggested that milk be so frothed or foamed by beaters, and the resulting foam or froth dried, but this I have found impracticable because of the instability of the large bubbles thus produced, and the impossibility of thus homogeneously and persistently aerating the milk treated.

It will be noted that during their passage through the drying chamber, the rise in temperature imparted to the air globules occluded in my batter, causes them to expand to an extent sufficient to stretch or distend the drying milk solids which surround them, but not sufficiently to burst these asunder and thus liberate the air.

My dried milk product possesses, owing to its method of production as above described, peculiar physical and other advantageous characteristics which are not found in any other dried milk products known to me.

Viewed, in mass, as first dislodged from the belt, it appears as an aggregation of interdetached flake-like groups of mutually-coherent dry milk solids, but so molded and conformed as to impart a multitude of cells, or concavely curved interior surfaces to each of said groups. These concavely curved interior surfaces are mostly so minute that some, or portions of some of them, persist, however minutely the original flakes are afterward further subdivided, or even pulverized, and they, therefore, usually provide, by aid of the microscope, one of the ear marks by which my product can be identified.

In most particles of my product will also be found some, as yet, intact air cells, which are as necessarily follows from their creation by compressed air of circular form, or having at least some portions of their interior surfaces of truly spherical, concave, contour. The homogeneous permeation of the product by the cells is also another distinguishing feature, and so is the microscopic minuteness of the cells and the closeness of their approximation to each other. The foregoing characteristics are illustrated to the limited extent available in Patent Office drawings by Figs. 1, 2 and 3.

Fig. 1 is a perspective view of an aggregation of the flakes as broken off of the belt, and of about double their natural size. Fig. 2 is a like view of one of the flakes very greatly magnified. It will be noted that the major surfaces of the flake, the upper and lower, as on the belt, are comparatively smooth, though somewhat unevened by the minute tumuli, indicating the thereunder presence of cells, and that the edges of the flake are very much more irregular and indented. This comparative smoothness of the major surfaces is attributable, I think, to the slight pressures applied thereto, before complete drying, during the operation as above described, such pressures tending to, to an extent, smooth or iron the surfaces, without, however, bursting the bubbles.

Fig. 3 is intended to represent a perspective view of a very minute fragment, or corner, of one of my flakes enormously magnified. This view shows three different aspects of the flake. The plane marked $a$ is the unbroken upper surface, which is, as above stated, comparatively smooth save for the slight spheroidal tumuli or protuberances caused by the underlying imprisoned air particles. The face of this specimen marked $b$ is that of a sectional cut through the mass. This exposes to view the concavities of the cells, their apparent size varying from full where the section is medial of a bubble, as at $b'$, to much smaller where the section traversed only a limb of the cell. But it will be understood that the cells are not all of them of uniform size; there being more or less numerous variations in their respective diameters. The side of the fragment marked $c$ represents a mere breakage of the flake. In this it will be noted that the cleavage leaves some of the cells largely protuberant, but intact, which are therefore, like $c'$, shown as convexities, while others have been broken open and are, therefore, like $c^2$, intended to be shown as concavities.

The dry milk solids constituting the matrix of the cells, are mutually-coherent, but necessarily distended, i. e. more or less stretched, into reciprocal conformity with the shapes of the cells.

To the above noted peculiarities of my product is attributable, in part, its unprecedented rapidity and completeness of solution in water or other liquid. Instead of then massing or "balling" in the solvent, as do all other forms of dried milk powders, or dried milk, known to me, my product literally melts away, progressively and at a uniform, very rapid rate, and this without need of any of the usual stirring. This is, I believe, because the cell distended, cellular structure, is maintained to the last, the water attacking the exteriors of the finely divided milk solids, which are supported in open or separated condition, as the liquefaction proceeds, thereby constantly opening fresh surfaces to the solvent as the walls of cell after cell are broken down.

This maintains open to the action of the solvent, a much greater aggregate extent of surface of the solids than could otherwise be. Moreover, as cell after cell is broken down, the therein contained globule of air rises through the bath, producing a gentle local disturbance, which further accelerates the solvent action by imparting movement to minute detached particles.

As follows from the above noted avoidance of high temperatures and other peculiarities of the operation, during the entire treatment of the milk, the reconstituted article derived from dissolving my dried product, has the taste and other characteristics of natural fluid milk in more perfect degree than obtainable by solution of any other dried milk product known to me. My observations and tests indicate that the peptogenic properties and effects of my product thus reconstituted, are greater, and more beneficial to the consumer than those of the natural milk, whence derived.

Another, as I believe, distinguishing characteristic of my dried milk is, in the majority of cases, its exceptional whiteness, it being decidedly of a more purely white color or shade than any other dried milk product known to me.

Another distinguishing characteristic is its sweetness to the taste. I know of no other dried milk unadulterated by additions of saccharine matter, which possesses this peculiarity. On placing a number of my freshly produced flakes upon the tongue, a definite sweet taste as of sugar is at once experienced, though this is apt to become less marked in proportion to the length of time the flakes are kept in storage.

The sweet taste referred to, is, of course, attributable to nothing but the milk sugar, but as affected in form, or environment by the treatment accorded by my method.

Another peculiarity which distinguishes my product is that more or less of its albumin, or casein, or both, are in distended or stretched, dry, condition. This seems due to the pressure exerted upon particles of those constituents, during the drying, by expansion of the occluded air globules by the heat. I believe that this stretched or distended condition may explain the above noted remarkable presence of natural flavor in the milk reconstituted from my product, and that to this also may be attributed the sweetness of taste in the dried undissolved product.

The rods 19' are preferably cylindrical, i. e., of circular cross section, their function being to continuously slice or cut smoothly and evenly, in a multitude of planes, the viscid concentrate through which the air is being upwardly and relatively gently forced, and thus produce the desired impregnation with the least possible ebullition from the surface. To this end, the mixing device 19 is preferably maintained at all times completely immersed in the concentrate, thus avoiding any spasmodic beating into the latter of uncontrollably irregular volumes of surface air.

The dimensions of each of the intercommunicating chambers of the tank 12 may, in the specimens shown in the drawings, be taken to be 12 inches square by 30 inches deep. The tops of the openings 17 are about 18 inches above the floor of the chambers. These dimensions will, of course, be varied according to circumstances, and I mention them only as a guide to approximately proper proportions.

I do not, of course, confine myself to the particular appliances shown in the drawings in aid of the working of my method of producing dried milk; nor, in so far as I have herein claimed any features of said appliances, to the particular forms, connections, or relative proportions thereof so shown, as compared with their mechanical and functional equivalents.

My researches have further demonstrated that particularly good, if not the best, results are often attainable by concentrating the skimmed milk employed down to about one-sixth, or less, of its original volume, and before or after introducing it into the aerating and stirring tank, diluting it with water in quantity about 50 per cent. of the original volume of the water, thus bringing the volume of the mixture up to about one-quarter that of the original milk. Such commingling of water with the concentrate appears, in some instances, to promote the aeration and its homogeneity, and also to result in other desirable features in the aerated batter, and in the final dried product.

The diameters of cells containing occluded air usually vary in my dried product from approximately one one-thousandth to two two-hundred and fifteenth of an inch.

Having thus described my invention, what I claim and desire to secure by Letters Patent is the following:

1. The method of drying milk which comprises concentrating it, injecting a gas into the concentrate and simultaneously stirring it, and drying the resulting aerated batter.

2. The method of drying milk which comprises concentrating it, injecting a gas into the concentrate and simultaneously stirring it, depositing the resulting aerated batter on an air-permeable conveyer, and applying thereto a gaseous drying agent.

3. The method of drying milk which comprises concentrating it, injecting a gas into the concentrate and simultaneously stirring it, depositing the resulting aerated batter in a uniformly thick layer, upon an air-permeable conveyer, and applying thereto a gaseous drying agent.

4. The method of drying milk which comprises concentrating it, diluting the resulting concentrate with water, injecting a gas into the resulting conglomerate of concentrate and water, and simultaneously stirring it, and drying the resulting aerated batter.

5. The method of drying milk which comprises concentrating it down to about one-sixth of its original volume, diluting the resulting concentrate with water in volume about fifty per cent. of the original volume of the milk, injecting a gas into the resulting mixture of concentrate and water and simultaneously stirring it, and drying the resulting aerated batter.

6. Dried milk in the form of a matrix consisting essentially of mutually coherent milk solids, impregnated throughout with gas-containing substantially spherical concavities.

7. The new manufacture, consisting essentially of an aggregation of independent flake-like groups of dried milk each in the form of a matrix composed of mutually-coherent milk solids, impregnated throughout with gas-containing substantially spherical concavities.

8. The method of drying milk which comprises concentrating it, injecting a gas into the concentrate, intimately mixing the gas with the concentrate, and drying the resulting aerated batter.

9. The method of drying milk which comprises concentrating it, injecting compressed gas into the viscous concentrate, minutely subdividing the injected gas while it is in the concentrate, and drying the resulting aerated batter.

CHARLES H. CAMPBELL.

Witnesses:
   A. C. BURNHAM,
   WALTER ENGELS.